United States Patent [19]

Young

[11] 4,365,159

[45] Dec. 21, 1982

[54] LITHIUM-6 FOIL NEUTRON DETECTOR

[75] Inventor: Charles A. Young, San Diego, Calif.

[73] Assignee: The United States of America as represented by the Secretary of the Navy, Washington, D.C.

[21] Appl. No.: 203,006

[22] Filed: Nov. 3, 1980

[51] Int. Cl.[3] .......................... G01J 1/18; H01J 47/12

[52] U.S. Cl. .......................... 250/385; 250/390

[58] Field of Search ............... 250/374, 382, 385, 390, 250/391, 392; 376/254, 255

[56] References Cited

U.S. PATENT DOCUMENTS

| | | | |
|---|---|---|---|
| 2,186,757 | 1/1940 | Kallmann et al. | 250/83 |
| 2,711,483 | 6/1955 | Herzog | 250/83.6 |
| 2,721,944 | 10/1955 | Ruble | 250/83.1 |
| 2,793,309 | 5/1957 | Simpson, Jr. | 313/61 |
| 3,666,950 | 5/1972 | Ferber et al. | 250/83.1 |
| 3,805,078 | 4/1974 | Kozlov | 250/390 |

*Primary Examiner*—Alfred E. Smith
*Assistant Examiner*—Janice A. Howell
*Attorney, Agent, or Firm*—Robert F. Beers; Ervin F. Johnston; James O. Skarsten

[57] ABSTRACT

A neutron detection apparatus is provided which includes a selected number of flat surfaces of lithium-6 foil, and which further includes a gas mixture in contact with each of the flat surfaces for selectively reacting to charged particles emitted by or radiated from the lithium foil. A container is provided to seal the lithium foil and the gas mixture in a volume from which water vapor and atmospheric gases are excluded, the container having one or more walls which are transmissive to neutrons. Monitoring equipment in contact with the gas mixture detects reactions taking place in the gas mixture, and, in response to such reactions, provides notice of the flux of neutrons passing through the volume of the detector.

15 Claims, 6 Drawing Figures

LITHIUM-6 FOIL NEUTRON DETECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein pertains to the field of neutron detection devices of the type which employ lithium-6, in a solid form, to respond to neutrons by radiating charged particles into an ionizable counting gas. More specifically, the invention pertains to detection devices of the above type wherein the lithium radiator is configured to provide one or more flat surfaces of lithium-6 foil in contact with ionizable gas, each surface being in spaced parallel relationship with an array of high voltage count wires which indirectly measure neutron activity by sensing pulses of gas ionization. Even more particularly, the invention pertains to detection devices of the above type wherein a plurality of flat lithium-6 foil surfaces may be stacked in parallel layers with one another, and with arrays of counting wires, in order to provide a neutron detector which is of very high sensitivity and which is yet capable of being contained in a package which is extremely portable, compact, and durable.

At present, most high-sensitivity neutron detectors of the radiator-ionizable gas type employ either $^{10}BF_3$ or $^{3}He$, in a gaseous state, as the radiator medium for the detector, i.e., for the detector component which receives neutrons and which radiates ionizing particles in response thereto. $^{3}He$ is always in a gaseous state at practical temperatures and pressures. $^{10}BF_3$ must be employed in a gaseous state, since the principal ionizing particle which results from the reaction between a neutron and a boron nucleus of $^{10}BF_3$ is an alpha particle, which is of extremely short range (e.g., $5\times10^{-3}$ mm). If a reaction generating an alpha particle were to take place within a solid material, the dimensions of the material would have to be extremely small, to prevent the alpha particles from being trapped therewithin.

Because of the low density of $^{10}BF_3$ and $^{3}He$ at ordinary pressures, they must be contained in chambers of large volume in order to be used as the radiator component in a neutron detector. Consequently, such detectors tend to be comparatively large or bulky. While neutron detectors are available which have used a solid layer of $^{10}B$ as an alpha particle radiator, the layer must be kept very thin, as aforementioned, (e.g., $10^{-2}$ mm) and it may still be necessary to supplement the $^{10}B$ radiator with one of the above gaseous radiator components.

In the past, solid lithium-6 ($^{6}Li$) has been used as the neutron sensitive component in a radiator-ionizable gas neutron detector, wherein the $^{6}L_i$ is coated upon the curved inner surface of a cylinder. Note, for example, U.S. Pat. No. 2,721,944, issued Sept. 9, 1950, which discloses a neutron detector for use in geological exploration of oil fields. However, the Applicant has found that if, instead of such curved arrangement, a number of flat sheets of $^{6}L_i$ are employed in a neutron detector, it becomes possible to provide a substantial reduction in detector size and to increase the ruggedness thereof, and yet provide high detection sensitivity. The Applicant uses flat sheets of $^{6}L_i$ so that the sheets may be stacked in parallel layers within a thin, flat container. By enabling a number of sheets to be enclosed in the container, high sensitivity to neutron detection is provided since the probablility that a neutron entering the container will encounter a lithium-6 nucleus is optimized. By making the detector flat and thin, a neutron striking the detector from almost any angle will pass into at least one of the $^{6}L_i$ sheets. Also, by stacking sheets in parallel relationship, the space between sheets, which is filled with ionizable counting gas, may be made so small that gamma rays generated within the detector can be prevented from being registered as neutron counts. High-sensitivity neutron detectors employing the principles of the present invention have been fabricated which are small enough to be held in an operator's hand, and to be carried in a coat pocket.

SUMMARY OF THE INVENTION

In the present invention, a neutron detection apparatus is provided which includes a selected number of flat surfaces of lithium-6 foil, and further includes a gas mixture in contact with each of the surfaces for selectively reacting to charged particles radiated from the lithium foil. A container means is provided for sealing the lithium foil and the reacting gas mixture within a volume from which water vapor and atmospheric gases are excluded, the container means having walls which are transmissive to neutrons. A monitoring means in contact with the gas mixture detects reactions in the gas mixture, and in response to detected reactions provides an output which represents the flux of neutrons passing through the detector volume.

Preferably, the lithium-6 foil comprises one or more flat sheets of lithium-6, the thickness of each sheet being substantially less than the range of a triton particle when such particle is traveling through lithium. The gas mixture comprises a counting gas which is readily ionized when charged particles pass through it, and the lithium foil and the counting gas are enclosed together within a flat, hermetically sealed container. Preferably also, the monitoring means includes an array of count wires which are maintained at a selected high voltage within the container, such array being in spaced parallel relationship with one of the sheets of lithium foil. An electronic processing means, located externally to the container, is coupled to the array of count wires.

It has been found that a flat sheet of lithium foil may be enclosed within the container by bonding it to a flat inner wall of the container, whereby one side of the lithium sheet is exposed to the counting gas and to the interior of the container. Alternatively, the sheet may be suspended within the interior of the container, so that both sides of the sheet are exposed to the counting gas. In a preferred embodiment of the invention, a neutron detector is formed by enclosing a plurality of flat lithium sheets within a flat container, some of the sheets being bonded to container walls and others being suspended. The sheets are stacked in spaced parallel relationship, an array of counting wires being positioned in spaced parallel relationship with each lithium surface which is exposed to counting gas. It has been found that by so configuring the lithium sheets and wire arrays, a neutron detector may be provided which has a very high neutron sensitivity and a low gamma-ray sensitivity, and which is yet enclosed in a container having a thickness of less than one inch.

OBJECTS OF THE INVENTION

An object of the present invention is to provide a lighter, more compact neutron detector of high sensitivity.

Another object is to provide a neutron detector which employs one or more flat sheets of lithium-6 foil to radiate ionizing particles into a counting gas in response to neutrons received by the lithium sheets.

Another object is to provide a detecting device which is of high sensitivity to neutrons and low sensitivity to gamma rays which may be contained in a small, flat package having a thickness of less than one inch.

Another object is to provide a detecting device of the above type in which flat sheets of lithium-6 foil are spaced apart in parallel relationship so that the thickness of a layer of counting gas between them is very small, whereby there is substantially less ionization of the gas from gamma-ray passing therethrough than from a charged particle generated by a neutron.

Other objects and many of the attendant advantages of this invention will be readily appreciated as the same becomes better understood by reference to the following detailed description when considered in connection with the accompanying drawings.

DETAILED DESCRIPTION OF THE PREFERRED EMBODIMENT

Figure 1:
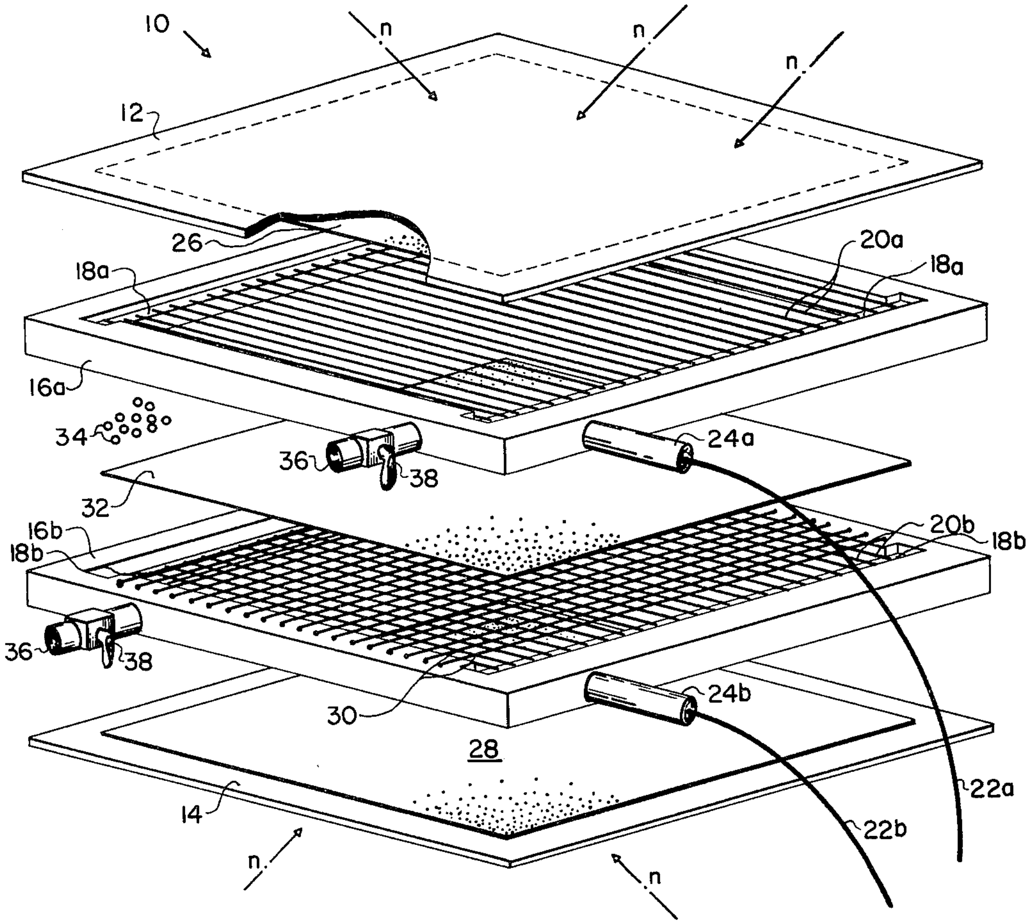
FIG. 1 is an exploded perspective view showing an embodiment of the invention.

Referring to FIG. 1, there are shown various components which may be assembled to form three-layer lithium-6 neutron detector 10. Detector 10 includes flat top and bottom plates 12 and 14, respectively, which are usefully formed of brass or other material which is highly transmissive to neutrons n in proximity to detector 10. Detector 10 further includes upper and lower support frame sections **16*a* and 16*b*, respectively, which are likewise formed of brass, and which are provided with slots for respectively retaining ceramic strips 18*a* and 18*b***.

By means of a silk-screening and high-temperature firing process, for example, strips **18*a* and 18*b* are metallized. A number of count wires 20*a* (e.g., 44) are tensioned between and soft-soldered to metallized strips 18*a* in parallel relationship with one another, at a spacing which usefully is $\frac{1}{8}$ inch. A like number of count wires 20*b* are similarly tensioned between and soft-soldered to ceramic strips 18*b*. Consequently, when detector 10 is assembled, upper and lower frame sections 16*a* and 16*b* support arrays of count wires 20*a* and 20*b*, respectively, in parallel relationship with one another and with top plate 12 and bottom plate 14**.

In order to apply a selected high positive voltage (e.g. 1,000 V) to each count wire **20*a*, a cable 22*a* passes through frame section 16*a*, through a coupling 24*a*, and is connected to one of the metallized strips 18*a*. Similarly, a cable 22*b* passes through a coupling 24*b* to apply a high positive voltage to each count wire 20*b***.

Referring further to FIG. 1, there is shown a flat sheet or layer 26 of lithium-6 metal bonded to the under surface of top plate 12, and there is also shown a flat sheet 28 of lithium-6 bonded to the upper surface of bottom plate 14. Sheets 26 and 28 may be bonded to their respective plates by heating the plate to just below the melting point of lithium, and then rubbing lithium foil onto the surface of the plate with the aid of a large soldering iron. A quantity of $^6L_i$ foil is applied to a plate which is sufficient to cover the surface of the plate to a depth of 50 microns (0.002 inches). By keeping the brass plate horizontal while a soldering iron is vigorously worked back and forth over the surface of the plate, it has been found that a lithium sheet of fairly uniform thickness may be bonded to the plate.

In addition to the array of count wires **20*a*, lower frame section 16*b* supports a grid of foil support wires 30 which are tensioned between and soft-soldered to opposing upper edges of lower frame section 16*b*. The grid formed by wires 30 is provided to support a layer or sheet of rolled $^6L_i$ foil 32 of 50 microns thickness. A similar grid of wires (not shown) is attached to the lower edges of upper frame section 16*a*, so that if sections 16*a* and 16*b* are joined together along their respective lower and upper edges, for example, by means of epoxy glue, $^6L_i$ foil layer 32** is immovably sandwiched therebetween.

Referring once more to FIG. 1, there is shown a counting gas mixture 34, which is sealed within an enclosed volume formed by hermetically joining sections **16*a* and *b*, top plate 12 and bottom plate 14. Counting gas 34** usefully comprises a mixture of 90% argon and 10% methane or 80% argon and 20% isobutane.

In order to assemble respective components of detector 10, all of the components are carefully cleaned and then placed into a glove box without being exposed to the atmosphere. As is well known, a glove box is a device which enables mechanical operations to be manually performed upon various work pieces or components while the components are isolated from both atmospheric gases and from water vapor. It is essential that lithium-6 be kept isolated therefrom because of its extremely reactive nature. The glove box may be filled with pure argon, an inert gas, to prevent any contact between lithium and elements or substances with which the lithium would react in such way that the lithium would be severely damaged.

It has been found that an epoxy glue may be employed to bond top plate 12 to the upper edges of frame section **16*a* and bottom plate 14 to the lower edges of frame section 16*b*, the count wires, $^6L_i$ flat sheets, and counting gas being hermetically sealed in the chamber formed thereby. After assembly, purge tubes 36, which penetrate to the interior of detector 10, are employed to introduce counting gas 34 into the chamber, purge tubes 36 being provided with shutoff valves 38**.

It has been found that frame sections **16*a* and 16*b* may each have a thickness of no more than one-quarter inch, so that detector 10 is very thin and flat. Most neutrons penetrating into detector 10** therefore pass into at least one of the lithium-6 foil sheets.

Figure 2:
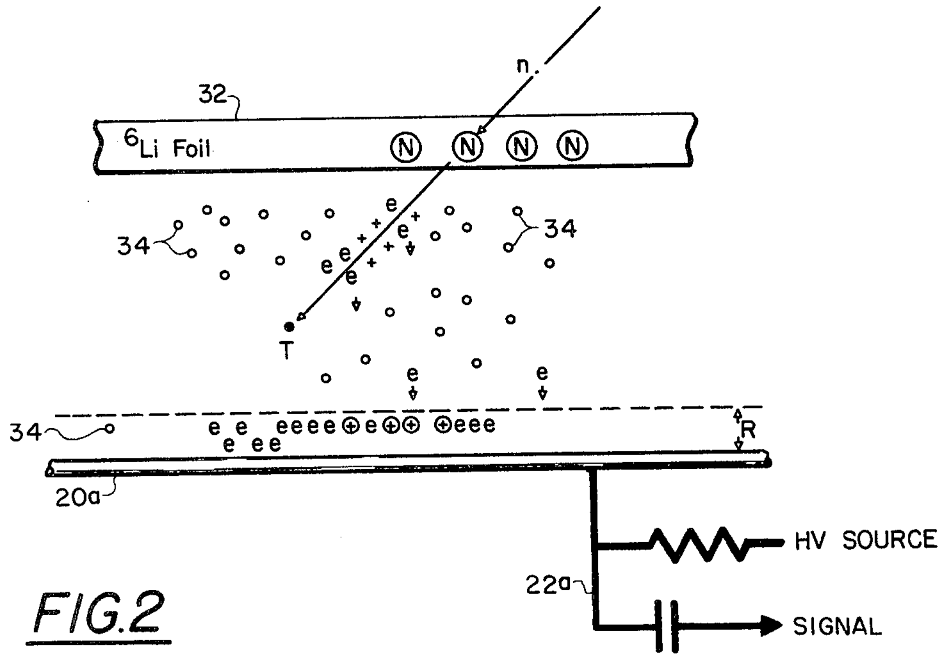
FIG. 2 is a schematic view for illustrating the principle of operation of the embodiment of FIG. 1.

Referring to FIG. 2, there is shown a neutron n entering one of the sheets of $^6L_i$ foil enclosed within detector 10. Because the foil is in a solid rather than a gaseous state, the density of lithium nuclei therein is very high and there is a very high probability that the neutron will react with, or be absorbed by, a $^6L_i$ nucleus N. When a neutron reacts with a $^6L_i$ nucleus, the following reaction occurs:

$$^6L_i + n \rightarrow {}^3H + {}^4He + 4.78 \text{ Mev.}$$

As is well known, $^3H$ is a triton particle. As is also well known, the range of a triton particle traveling through $^6L_i$ is comparatively long (e.g. 0.135 millimeters). Consequently, in excess of 70% of the triton particles resulting from the reaction between a neutron and a $^6L_i$ nucleus are able to escape from a layer of lithium of 50 microns thickness. By providing lithium foil layer 32, which is suspended within the chamber of detector 10, four lithium surfaces are provided from which triton particles T can be emitted into the chamber, and come into contact with counting gas 34.

Emitted tritons (or alpha particles which are able to escape the lithium) cause counting gas which they encounter to become ionized, generating electrons e. Since each of the count wires 20*a* and 20*b* of the count wire arrays is maintained at a high positive voltage, as aforementioned, released electrons are attracted thereto. When attracted electrons come within a range R of a count wire, they enter a region of avalanche multiplication, wherein they interact with counting gas to substantially increase the level of counting gas ionization. Sufficient electrons are released by counting gas in the avalanche multiplication regions of respective count wires to generate millivolt-size pulses thereupon. Such pulses may be readily detected and measured by electronic apparatus external to detector 10 to provide a quantitative indication of neutron activity.

While using detector 10 to monitor neutrons, it may be very important to prevent gamma rays occurring in the detector from being registered as neutron counts. By providing the aforementioned one-quarter inch spacing between lithium-6 sheets, the layer of counting gas 34 between adjacent sheets, or between a sheet and a wall, is too thin to enable significant ionization of the gas by a gamma-ray. The pulse generated by a gamma-ray is therefore detectably less than the pulse generated by a neutron in detector 10, and may therefore be readily distinguished from a neutron pulse.

Figure 3:
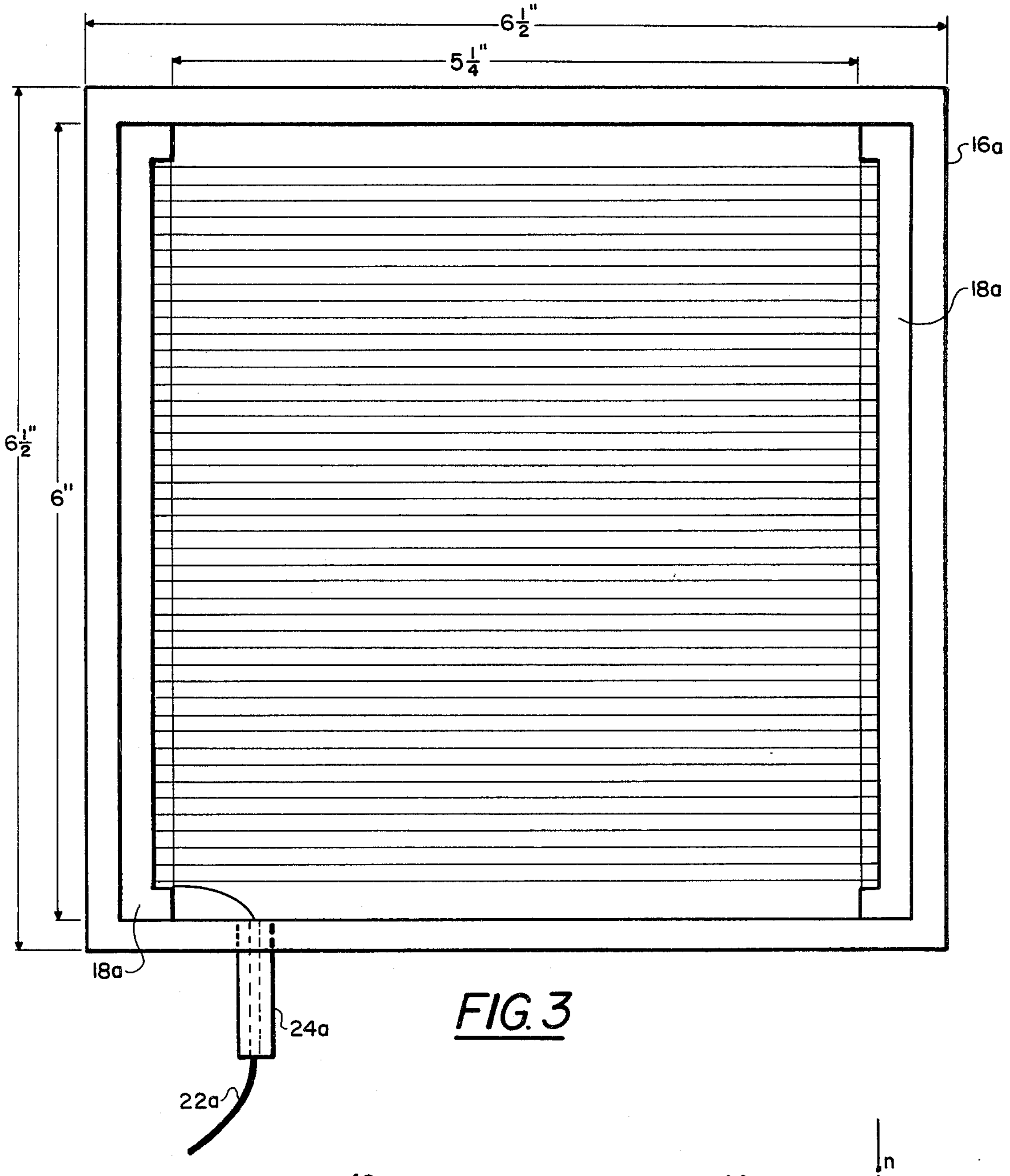
FIG. 3 is an overhead view showing an array of count wires for the embodiment of FIG. 1.

Referring to FIG. 3, there is shown an overhead or plan view of upper frame section 16*a*, together with useful inner and outer dimensions therefor. Lower frame support section 16*b* is similar or identical thereto, so that frame sections 16*a* and 16*b* may be joined, as aforementioned, to form integrated sidewalls for the chamber of detector 10. If detector 10 is intended to be used in situations where small size and compactness are important, it may have an outer cross-section on the order of $6\frac{1}{2}'' \times 6\frac{1}{2}''$. Its inner dimensions, the dimensions of the chamber which contains the counting gas, flat $^6L_i$ sheets and count wires, may be $6'' \times 5\frac{1}{4}''$.

Figure 4:
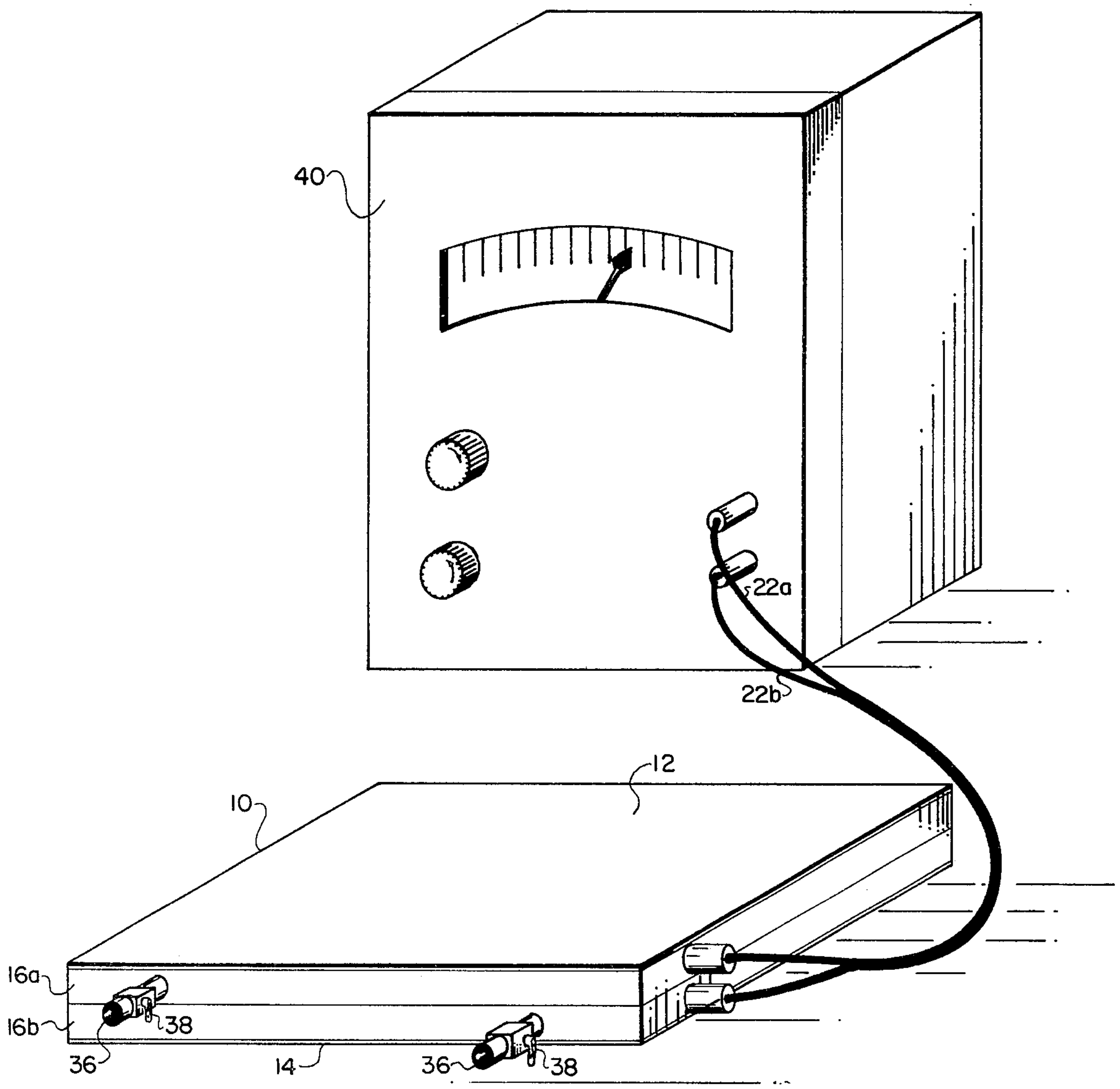
FIG. 4 is a perspective view showing the embodiment of FIG. 1 fully assembled and coupled to monitoring electronics.

Referring to FIG. 4, there is shown detector 10 in a fully assembled form, conductors 22*a* and *b* being connected to monitoring electronics 40. Monitoring electronics 40 usefully includes a source of high voltage, a pulse height discriminator, and a scaler, the latter two devices being well known in the art of charged particle proportional counting systems. Low-level pulses coupled through conductors 22*a* and *b*, which are caused by noise or gamma-ray absorption, are rejected by the pulse height discriminator. Other pulses, which are sufficiently high that they may be presumed to result from the reaction between a neutron and a lithium nucleus included in one of the lithium-6 sheets of detector 10, are recorded by the scaler as neutron counts.

Figure 5:
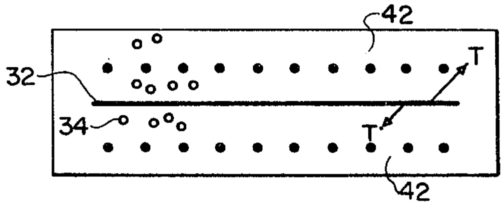
FIGS. 5 and 6 are schematic views which illustrate modifications of the embodiment of FIG. 1.

Referring to FIG. 5, there is shown a first modification of the invention, wherein only a single flat sheet of $^6L_i$ foil 32 is provided to radiate charged particles in relation to adjacent neutron activity level. It will be noted that by suspending the sheet in the detector, tritons T may be radiated from either surface thereof into counting gas contained within the detector chamber. An array of parallel count wires 42 is maintained in spaced parallel relationship with each surface of the $^6L_i$ foil.

Figure 6:
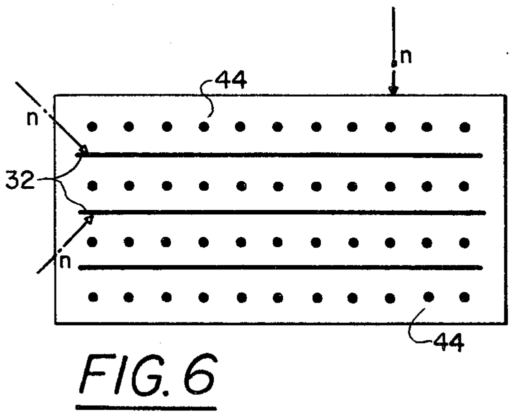

Referring to FIG. 6, there is shown a second modification of the invention, wherein three flat sheets of $^6L_i$ foil 32 are suspended within the chamber of a neutron detector, to provide maximum opportunity for a neutron entering the detector to collide with a lithium-6 nucleus. An array of parallel count wires 44 is maintained in spaced parallel relationship with each surface of each sheet of $^6L_i$ foil.

Obviously, many other modifications and variations of the present invention are possible in the light of the above teachings. It is therefore to be understood that within the scope of the appended claims the invention may be practiced otherwise than as specifically described.

What is claimed:

1. Neutron detection apparatus comprising:

a selected number of flat surfaces of lithium-6 foil, each said flat surface of lithium-6 foil comprising a flat lithium-6 sheet, the thickness of each of said sheets being less than the range of a triton particle through lithium;

a gas mixture in contact with each of said flat lithium foil surfaces for selectively reacting to charged particles radiated from said lithium-6 foil, said gas mixture comprising a counting gas mixture which is readily ionized by triton particles passing through said counting gas mixture;

container means for sealing said lithium foil and said reacting gas mixture within a volume from which water vapor and atmospheric gases are excluded, said container means having walls which are transmissive to neutrons; and monitoring means in contact with said gas mixture for detecting reactions in said gas mixture, and for providing an output which is proportional to the flux of neutrons through said apparatus.

2. The apparatus of claim 1 wherein said monitoring means comprises:

a selected number of arrays of count wires which are enclosed within said container means and maintained in spaced parallel relationship with said sheets of lithium-6 foil; and electronic processing means external to said container means which is coupled to said count wire arrays.

3. The apparatus of claim 1 wherein:

said container means comprises a hermetically sealed container of selected interior dimensions; and means are provided for suspending at least one of said flat sheets of lithium-6 foil within said container so that both surfaces of said suspended sheet are in contact with said proportional counting gas mixture.

4. The apparatus of claim 2 wherein:

said container means comprises a hermetically sealed container having a selected number of flat interior surfaces; and one of said flat sheets of lithium-6 foil is bonded to each of said interior surfaces.

5. The apparatus of claim 2 wherein:

said container means comprises a hermetically sealed container having a selected number of flat interior surfaces;

means are provided for suspending one or more of said flat sheets of lithium-6 foil within said container so that all of said suspended sheets are in spaced parallel relationship with one another and with each of said flat interior surfaces of said container; and one of said flat sheets of lithium-6 foil is bonded to each of said flat interior surfaces of said container.

6. The apparatus of claim 5 wherein:

one of said count wire arrays is maintained in spaced parallel relationship with each surface of said sheets of lithium-6 foil which is in contact with said counting gas, each of said arrays comprising a selected number of count wires which are maintained in closely spaced parallel relationship.

7. The apparatus of claim 6 wherein said electronic processing means comprises:

means for maintaining a selected positive high voltage on each of said count wires of said count wire arrays;

pulse discriminator means for distinguishing voltage pulses provided by said count wires arrays which are of sufficient magnitude to be considered as having been generated within said container by a reaction between a neutron and a lithium-6 nucleus; and scaler means coupled to said pulse discriminator means for representing the level of neutron activity proximate to said container means in response to successive pulse outputs of said pulse discriminator.

8. The apparatus of claim 7 wherein:

the spacing between said sheets of lithium-6 foil is selected to form layers of counting gas which are sufficiently thin that a gamma-ray passing through one of said gas layers is unable to generate a voltage pulse which is indistinguishable from a voltage pulse resulting from one of said reactions between a neutron and a lithium-6 nucleus.

9. The apparatus of claim 7 wherein;

said counting gas mixture comprises a mixture of 90% argon gas and 10% methane gas.

10. The apparatus of claim 7 wherein:

said counting gas mixture comprises a mixture of 80% argon gas and 20% isobutane gas.

11. The apparatus of claim 7 wherein:

said container includes walls in parallel relationship with said sheets of lithium-6 foil which are formed of brass.

12. Neutron detection apparatus comprising:

a plurality of flat sheets of lithium-6 foil which are stacked in spaced-apart parallel relationship;

a selected counting gas mixture which is in contact with a number of surfaces of said sheets of lithium-6 foil;

an array of count wires in spaced parallel relationship with each of the surfaces of said lithium sheets which is in contact with said counting gas;

container means for enclosing said lithium-6 sheets, said counting gas, and said count wire arrays in a hermetically sealed chamber, one or more of the walls of said chamber being formed of material which is transmissive to neutrons; and means penetrating said container means for enabling said count wires to be electrically coupled to electronic processing equipment.

13. The apparatus of claim 12 wherein:

said container means comprises a container having top and bottom walls which are in parallel relationship with said flat sheets of lithium-6 foil, said top and bottom walls each comprising a flat structure having edges which are all of greater length than the distance which separates said top and bottom walls.

14. The apparatus of claim 13 wherein:

said top wall and said bottom wall each comprises a structure having edges which are 12 inches or less the distance separating said top and bottom walls being less than one inch.

15. The apparatus of claim 14 wherein:

each of said arrays of count wires comprises a selected number of wires maintained in parallel relationship at a spacing which is less than an inch.

* * * * *